Dec. 31, 1940.  A. P. BALL  2,226,840
TRIM PANEL ASSEMBLY
Original Filed Nov. 18, 1935
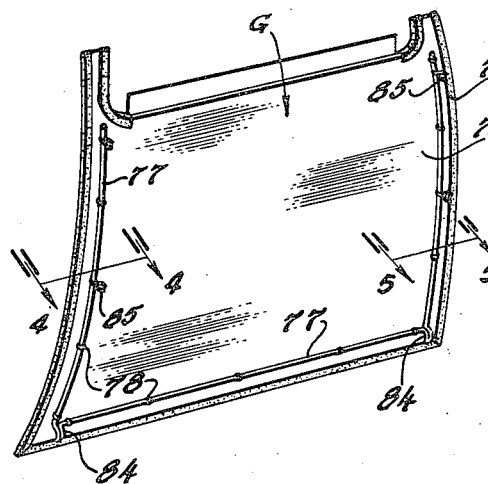
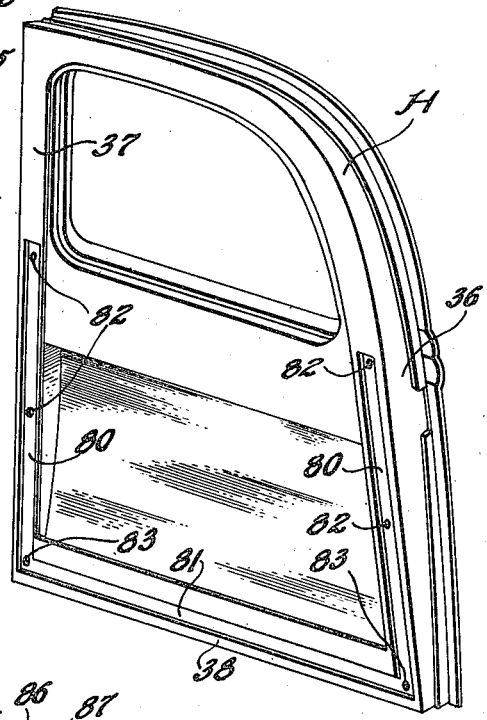
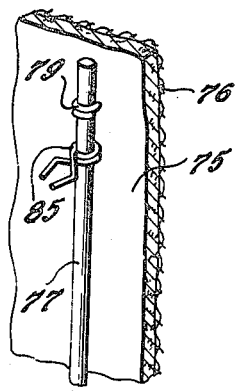
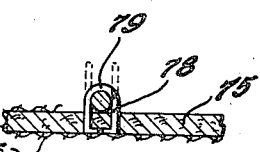
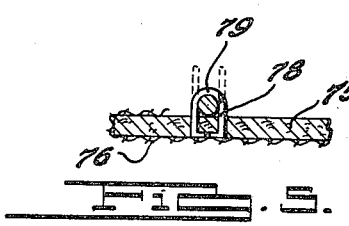
INVENTOR
Albert P. Ball
BY Dike, Calver & Gray
ATTORNEYS Patented Dec. 31, 1940

2,226,840

UNITED STATES PATENT OFFICE 2,226,840

TRIM PANEL ASSEMBLY

Albert P. Ball, Detroit, Mich., assignor to Briggs Manufacturing Company, Detroit, Mich., a corporation of Michigan Original application November 18, 1935, Serial No. 50,331. Divided and this application March 4, 1939, Serial No. 259,733

3 Claims. (Cl. 45—138)

This invention relates to trim panels or trim panel assemblies particularly adapted for use in the interior trim finish of automobile or other vehicle bodies, an object of the invention being to provide a new and improved interior trim panel, or trim panel assembly, and an improved method of forming, constructing and applying the trim portions of the body. The present application is a division of my co-pending application Serial No. 50,331, filed November 18, 1935 which matured into Patent No. 2,160,636.

In conventional practice the interior body trim, including portions of the trimming for the doors, comprises panels usually composed of non-metallic backing sheets covered with the trim fabric, these panels being usually attached to the doors or other framing supports of the body by means of separate concealed snap fasteners. These fasteners are usually in the form of bent wire devices which must be anchored by hand in apertures in retainer plates or sockets located at the back of the trim panel and which, when the panel is mounted on the body, fasten into apertures in the latter. This mode of constructing and attaching the trim panels to the body framing has many disadvantages. Because of the large numbers of these fastener devices required for each body and the time, labor and expense necessary for their manufacture and installation, the use thereof in practice amounts to a substantial item of expense in the manufacture of automobile bodies.

An important object of the present invention is to eliminate these disadvantages, simplify and improve the construction of the trim panels, reduce the cost thereof, and provide improved and better means and method for fastening the trim panels to the doors and other frame portions of the body whereby substantial manufacturing economies are obtained while at the same time providing a more satisfactory, simple and efficient construction.

A further object of the invention is to provide a trim panel which may be composed of a relatively stiff backing sheet, either of non-metallic or metallic material, adapted to be covered with fabric or other trim material, and which panel is bent or otherwise preformed so as to be maintained normally in bowed condition, fastening means being provided whereby upon attaching or fastening the panel to the body support, the panel will be reversely bent and maintained under tension when mounted on the support.

Other objects of this invention will appear in the following description and appended claims, reference being had to the accompanying drawing forming a part of this specification wherein like reference characters designate corresponding parts in the several views.

Fig. 1 is a perspective view of a trim panel, looking at the rear side thereof and illustrating one embodiment of the present invention.

Fig. 2 is a perspective view of an automobile door, looking at the rear side thereof, constructed for the attachment thereto of the panel illustrated in Fig. 1.

Fig. 3 is a detail perspective view, in section, illustrating the manner of supporting the fasteners on the panel of Fig. 1.

Figs. 4 and 5 are detail sections taken respectively through lines 4—4 and 5—5 of Fig. 1.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring to the embodiment of the present invention illustrated in Figs. 1 to 5 inclusive, it will be seen that in this instance the trim panel G comprises a non-metallic backing sheet 75 of suitable material, such as fiber-board, the outer face of which is covered by a sheet of trim fabric 76 which is folded around the edges of the backing sheet and cemented thereto. Mounted upon the rear face of the backing sheet is a tensioning means comprising, in this instance, a single length of heavy gauge wire 77 bent into a three sided frame which is attached to the backing sheet 75, see Fig. 5, at suitable intervals by means of staples 78. These staples may be driven through the sheet from the front face thereof and the ends 79 looped or clinched around the wire 77. The sides of the wire frame 77 are bowed, thereby imparting to the backing sheet 75 an initial curved or bowed formation. The fastener lugs are, in this instance, omitted at the upper terminal ends of the wire members, the lower ends, however, being provided with projecting fastener lugs 84. The bowed trim panel G may be releasably attached to a suitable framing portion of the body and, in the present instance, is designed for attachment to a vehicle door H shown in Fig. 2. As shown, the front and rear pillars 36 and 37 of the door and the lower cross-frame member 38 are stamped or pressed at the inner faces thereof to provide connected channels or grooves 80 and 81. The metal at the base of these channels is pierced to provide a suitable number of holes or apertures 82 and 83. In attaching the panel G to the door frame, the wire framing 77 will lie within the channels 80 and 81 which provide sufficient clearance to permit the trim panel to lie flat against the door frame. The lugs 84 will interlock in the lower apertures 83. In this instance, however, the panel is additionally attached to the door frame by means of spring wire fastener elements 85, see Fig. 4. Each fastener element or device comprises a base looped around the wire 77 with the projecting ends of the fastener reversely bent to provide wedge-shaped shoulders 86 and closely spaced terminal ends 87. The fastener devices 85 are slidable along the wire members 77 intermediate the points of attachment 78 thereof. Hence, the apertures 82, cooperating therewith, do not need to be accurately located on the door frame since, in attaching the panel, the devices 85 may be readily adjustable on the wire 77 to register with the apertures 82. The free ends 87 of the fasteners are forced through the apertures 82, compressing the same together, and the parts are locked by means of the shoulders 86 engaging the edges of the apertures, as shown in Fig. 4. It will be understood that the trim panel G is assembled and held in reversely bent or flattened condition and under tension on the door H.

I claim:

1. A trim panel comprising a relatively stiff backing sheet, spring metal strips extending along edges thereof and bowed to hold the panel normally in bowed condition, and devices adjustably carried by said strips for releasably attaching the same to a body support.

2. A trim panel comprising a fabric covered backing sheet, concealed spring wire members attached to the back face of the sheet, and fastener devices slidingly mounted on said members for releasably attaching the panel to a support, said members being formed to maintain the panel under spring pressure against the face of the support.

3. A trim panel comprising a fabric covered backing sheet, concealed spring wire members attached to the back face of the sheet adjacent two or more of its edges, and fastener devices slidingly mounted on said members for releasably attaching the panel to a support, said members being formed to maintain the panel under spring pressure against the face of the support.

ALBERT P. BALL.